US011476726B2

(12) United States Patent
Wang et al.

(10) Patent No.: US 11,476,726 B2
(45) Date of Patent: Oct. 18, 2022

(54) WIRELESS CHARGING DEVICE, SYSTEM, CONTROL METHOD, CHARGING EQUIPMENT AND COMPUTER READABLE STORAGE MEDIUM

(71) Applicant: BEIJING XIAOMI MOBILE SOFTWARE CO., LTD., Beijing (CN)

(72) Inventors: Yanteng Wang, Beijing (CN); Hui Li, Beijing (CN); Chunli Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 64 days.

(21) Appl. No.: 16/699,579

(22) Filed: Nov. 30, 2019

(65) Prior Publication Data

US 2021/0057941 A1 Feb. 25, 2021

(30) Foreign Application Priority Data

Aug. 21, 2019 (CN) .......................... 201910774363.3

(51) Int. Cl.
*H02J 50/90* (2016.01)
*H02J 50/12* (2016.01)
(Continued)

(52) U.S. Cl.
CPC .............. *H02J 50/90* (2016.02); *H01F 38/14* (2013.01); *H02J 7/00045* (2020.01); *H02J 7/02* (2013.01); *H02J 50/12* (2016.02); *H02J 50/80* (2016.02)

(58) Field of Classification Search
CPC .. H02J 50/90; H02J 50/80; H02J 50/12; H02J 7/00045; H02J 7/02; H02J 50/10; H02J 50/005; H01F 38/14; H01F 27/2823
See application file for complete search history.

(56) References Cited

U.S. PATENT DOCUMENTS 9,553,485 B2 * 1/2017 Singh ...................... H02J 7/025
10,427,549 B2 10/2019 Yang et al.
(Continued)

FOREIGN PATENT DOCUMENTS

CN 103336268 A 10/2013
CN 105006893 A 10/2015
(Continued)

OTHER PUBLICATIONS

Notice of Allowance of Russian Application No. 2019138564 dated May 26, 2020.
(Continued)

*Primary Examiner* — Nghia M Doan
(74) *Attorney, Agent, or Firm* — Syncoda LLC; Feng Ma

(57) ABSTRACT

A wireless charging device includes: a power supply circuit configured to provide an alternating current signal; a transmitting coil configured to convert the alternating current signal into electromagnetic waves to radiate to the receiving end; the wireless charging device further includes: a plurality of detecting coils configured to radiate energy to a receiving coil of the receiving end and generate an inductive signal; a movable coil carrier, the transmitting coil and the plurality of detecting coils are disposed on the movable coil carrier; a driving mechanism connected to the movable coil carrier and configured to drive the movable coil carrier to move; the controller configured to acquire inductive signals of the plurality of detecting coils, and control the position of the movable coil carrier by controlling the driving mechanism.

18 Claims, 3 Drawing Sheets

(51) Int. Cl.
*H02J 50/80* (2016.01)
*H02J 7/00* (2006.01)
*H01F 38/14* (2006.01)
*H02J 7/02* (2016.01)

(56) References Cited

U.S. PATENT DOCUMENTS

| | | | |
|---|---|---|---|
| 2010/0201315 A1 | 8/2010 | Oshimi et al. | |
| 2010/0270970 A1* | 10/2010 | Toya | H02J 50/12 320/108 |
| 2011/0163714 A1 | 7/2011 | Ettes et al. | |
| 2014/0159651 A1 | 6/2014 | Von Novak et al. | |
| 2016/0126778 A1* | 5/2016 | Kanahara | H02J 7/04 320/108 |

FOREIGN PATENT DOCUMENTS

| | | |
|---|---|---|
| CN | 106160260 A | 11/2016 |
| CN | 106981930 A | 7/2017 |
| CN | 108072314 A | 5/2018 |
| CN | 108725239 A | 11/2018 |
| CN | 109038847 A | 12/2018 |
| CN | 109217484 A | 1/2019 |
| JP | H09215211 A | 8/1997 |
| JP | 2009089464 A | 4/2009 |
| JP | 2009089464 A * | 4/2009 ............ H01M 10/46 |
| JP | 2009195034 A | 8/2009 |
| JP | 2009247194 A | 10/2009 |
| JP | 2013078198 A | 4/2013 |
| JP | 2013106427 A | 5/2013 |
| JP | 2013162707 A | 8/2013 |
| JP | 2016529865 A | 9/2016 |
| KR | 101257676 B1 | 5/2013 |
| RU | 2440635 C1 | 1/2012 |
| RU | 2656246 C2 | 6/2018 |
| WO | 2016014294 A1 | 1/2016 |

OTHER PUBLICATIONS

International Search Report of PCT Application No. PCT/CN2019/111070 dated May 20, 2020.
Extended European Search Report of European Application No. 19217916.6 dated Apr. 22, 2020.
International Search Report in Application No. PCT/CN2019/111070, dated May 20, 2020.
Korea Notice of Allowance in Application No. 10-2019-7033735, dated May 24, 2021.
Office Action in Application No. JP 2019-563227, dated Nov. 30, 2021.
China first office action in Application No. 201910774363.3 dated Aug. 10, 2022.

* cited by examiner

WIRELESS CHARGING DEVICE, SYSTEM, CONTROL METHOD, CHARGING EQUIPMENT AND COMPUTER READABLE STORAGE MEDIUM

CROSS-REFERENCE TO RELATED APPLICATION

This disclosure claims priority to Chinese Patent Application No. 201910774363.3, filed on Aug. 21, 2019, the disclosure of which is hereby incorporated by reference in its entirety.

BACKGROUND

With the development of smartphones, traditional wired charging technology is increasingly difficult to meet the needs of users for convenience, and wireless charging technology is gradually attracting attention.

In a wireless charging setting, a transmitting end radiates an electromagnetic wave by converting an electrical signal into the electromagnetic wave, and a receiving end receives the electromagnetic wave and converts it into an electrical signal so as to output to a battery.

SUMMARY

The present disclosure relates generally to the fields of wireless charging, and more specifically to a wireless charging device, a wireless charging system, a wireless charging control method, a charging equipment, and a computer-readable storage medium.

In one aspect, a wireless charging device is provided, and the wireless charging device including:

a power supply circuit configured to provide an alternating current signal;

a transmitting coil configured to convert the alternating current signal into electromagnetic waves to radiate to a receiving end;

a plurality of detecting coils arranged to be circumferentially spaced along the transmitting coil, the plurality of detecting coils forms a circular track which is concentric with the transmitting coil, and the detecting coils are configured to radiate energy to a receiving coil of the receiving end and generate an inductive signal;

a movable coil carrier, the transmitting coil and the plurality of detecting coils are disposed on the movable coil carrier;

a driving mechanism connected to the movable coil carrier and configured to drive the movable coil carrier to move;

a controller configured to acquire inductive signals of the plurality of detecting coils, and controls the position of the movable coil carrier by controlling the driving mechanism based on the inductive signals of the plurality of detecting coils In the embodiment of the present disclosure, a plurality of detecting coils are arranged spaced around the transmitting coil to generate an inductive signal with the receiving coil, and it is possible to determine whether the receiving coil and the transmitting coil are aligned according to a plurality of inductive signals since the magnitude of the inductive signal is related to the distance. When the receiving coil and the transmitting coil are not aligned, the position of the movable coil carrier can be controlled by the controller to align the receiving coil and the transmitting coil so as to improve the charging efficiency of the wireless charging. Meanwhile, since the detecting coil is arranged around the transmitting coil instead of being arranged between the transmitting coil and the receiving coil, there is no eddy current generated between the transmitting coil and the receiving coil, that is, there is no effect on the energy transfer between the transmitting coil and the receiving coil.

In an implementation of the embodiment of the present disclosure, the detecting coil is a rounded rectangular coil with 2 to 3 turns, and the rounded rectangular coil having a length direction which passes through the center of the transmitting coil.

In this implementation, a rounded rectangular coil with 2 to 3 turns is used as the detecting coil. On the one hand, it can be designed to be small enough so that even if a plurality of detecting coils are provided, the entire wireless charging device will not be oversized. On the other hand, this rounded rectangle design enables energy radiation between the detecting coil and the receiving coil to generate an inductive signal.

In an implementation of an embodiment of the present disclosure, the plurality of detecting coils are arranged in pairs, multiple pairs of the detecting coils are arranged to be evenly spaced, and each pair of the detecting coils is symmetric about the transmitting coil.

In this implementation, a plurality of detecting coils are arranged in pairs, and each pair of the detecting coils are symmetrically arranged with respect to the transmitting coils such that the controller can determine the position of the receiving coil based on the signals of each pair of the detecting coils.

In an implementation of an embodiment of the present disclosure, the controller is configured to compare a amplitude difference between two inductive signals detected by each pair of the detecting coils; when the amplitude difference between the two inductive signals detected by the at least one pair of the detecting coils is greater than a threshold, the position of the movable coil carrier is moved based on the amplitude difference between the two inductive signals detected by each pair of the detecting coils.

In this implementation, the amplitude of the inductive signal of each pair of the detecting coils represents the distance between the receiving coil and the two detecting coils. If the difference between the two amplitudes of the inductive signals of each pair of the detecting coils is greater than a threshold, it is then indicated that the receiving coil and the transmitting coil are not aligned in the direction of the pair of the detecting coils, so that the position of the movable coil carrier needs to be moved to align the receiving coil and the transmitting coil.

In an implementation of an embodiment of the present disclosure, the controller is configured to determine, based on the amplitude difference between the inductive signals of the pair of the detecting coils, the direction distance of the movable coil carrier moves in a direction in which the one pair of the detecting coils are arranged; and configured to determine, based on the direction and distance of the movable coil carrier moving in the direction in which all pairs of the detecting coils are arranged, the moving direction and distance of the movable coil carrier.

In this implementation, the offset in the direction of the pair of the detecting coils is determined according to the amplitude difference of the inductive signals of each pair of the detecting coils, thereby the distance needed to be moved is determined. Then the distances that need to be moved in each direction are integrated to obtain the direction and distance of the movable coil carrier that ultimately needs to be moved. Moving in this direction and at this distance may eliminate the offset in each direction and maximize the charging efficiency.

In an implementation of an embodiment of the present disclosure, the controller is further configured to compare the difference between the amplitude of the inductive signal of each detecting coil and the reference value, and if any difference between the amplitude and the reference value exceeds the threshold, it is determined that there is a receiving coil.

In this implementation, by the amplitude of the inductive signal of each detecting coil, it can be determined whether the current transmitting coil is correspondingly provided with a receiving coil. Only when it has determined that there is a receiving coil, it is determined whether the transmitting coil needs to be moved, in order to avoid moving without a receiving coil which may cause energy waste.

In an implementation of an embodiment of the present disclosure, both ends of the detecting coil are respectively configured as an excitation signal input end and an inductive signal output end.

In this implementation, two detecting coils are used as an excitation signal input end and an inductive signal output end, respectively. An excitation signal is input and generate an inductive signal with the receiving coil, based on which the present disclosure determines whether the transmitting coil and the receiving coil are aligned.

In an implementation of an embodiment of the present disclosure, a controllable switch is provided between the controller and each of the excitation signal input end and the inductive signal output end of each of the detecting coils, the controller is configured to cyclically control the controllable switch connected to each of the detecting coils to be turned on and off, and at any time, only one controllable switch connected to one of the detection coils is turned on.

In this implementation, each of the control coils is cyclically controlled by the controllable switch to prevent the each of the coils from working simultaneously and interfering with each other. Meanwhile, since each of the detecting coils is cyclically controlled, the receiving coil and the transmitting coil can be controlled to be aligned not only at the beginning of charging but also during charging.

In an implementation of an embodiment of the present disclosure, the movable coil carrier includes:

a circuit board, and the transmitting coil and the plurality of detecting coils are located on the circuit board.

In this implementation, the transmitting coil and the detecting coil are arranged on the circuit board, and then a driving mechanism is used to drive the movement thereof. On the one hand, it facilitates miniaturization by integrating the coils on the circuit board. On the other hand, it is easy to drive the coil to move by designing it on the circuit board.

In an implementation of an embodiment of the present disclosure, the device further includes:

a communication module configured to perform wireless communication with the receiving end to authenticate the receiving end;

the controller configured to control a position of the movable coil carrier based on the inductive signals of the plurality of detecting coils when the receiving end is authenticated.

In this implementation, the receiving end is authenticated by a communication module, and when the authentication is passed, the position of the movable coil carrier is controlled, in order to prevent the movable coil carrier from moving when the receiving end is an illegal receiving end which is not charged subsequently and avoid the energy waste that comes with it.

In another aspect, a wireless charging system is provided, and the wireless charging system includes a transmitting end and a receiving end;

the transmitting end is any above wireless charging device.

In another aspect, a wireless charging control method is provided, and the method is applied to the wireless charging device, and the wireless charging control method includes:

acquiring the inductive signals of the plurality of detecting coils;

controlling the position of the movable coil carrier based on the inductive signals of the plurality of detecting coils.

In an implementation of an embodiment of the present disclosure, the plurality of detecting coils are arranged in pairs, and the pairs of the detecting coils are arranged to be evenly spaced, moreover, each pair of the detecting coils is symmetrical about the transmitting coil. Furthermore, controlling the position of the movable coil carrier based on the inductive signals of the plurality of detecting coils includes:

comparing the amplitude difference between the two inductive signals detected by each pair of the detecting coils; when the amplitude difference between the two inductive signals detected by the at least one pair of the detecting coils is greater than a threshold, moving the position of the movable coil carrier based on the amplitude difference between the two inductive signals detected by each pair of the detecting coils.

In an implementation of an embodiment of the present disclosure, moving the position of the movable coil carrier based on the amplitude difference between the two inductive signals detected by each pair of the detecting coils includes:

determining the direction and distance of the movable coil carrier moving in a direction in which the one pair of the detecting coils are arranged, based on the amplitude difference between the inductive signals of the pair of the detecting coils; and determining the moving direction and distance of the movable coil carrier, based on the direction and distance of the movable coil carrier moving in the direction in which all pairs of the detecting coils are arranged.

In an implementation of an embodiment of the present disclosure, the method further includes:

comparing the difference between the amplitude of the inductive signal of each detecting coil and the reference value, and if any difference between the amplitude and the reference value exceeds the threshold, it is determined that there is a receiving coil.

In an implementation of an embodiment of the present disclosure, the method further includes:

performing wireless communication with the receiving end to authenticate the receiving end;

controlling a position of the movable coil carrier based on the inductive signals of the plurality of detecting coils when the receiving end is authenticated.

In another aspect, a charging equipment is provided, and the charging equipment includes:

processor;

a memory for storing processor executable instructions;

wherein the processor is configured to perform any above wireless charging control method.

In another aspect, a computer readable storage medium with computer instructions stored thereon is provided, and the computer instructions are executed by a processor to implement any above wireless charging control method.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments of the present disclosure and, together with the specification, serve to explain the principles of the disclosure.

DETAILED DESCRIPTION

Example embodiments will be described in detail and illustrated in the accompanying drawings. When the description hereinafter refers to the drawings, the same number in different drawings indicates the same or similar elements, unless having another indication. The implementations as described in the example embodiments do not represent all implementations in consistence with the present disclosure. Instead, these implementations are merely examples of devices and methods corresponding to some aspects of the present disclosure as detailed in the appended claims.

Figure 1:
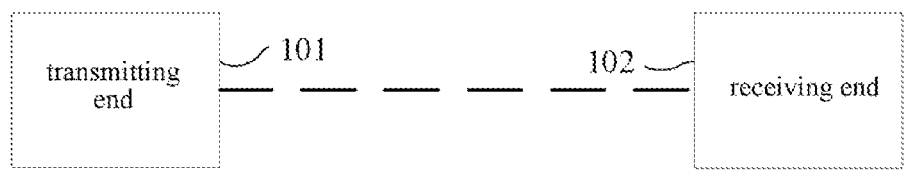
FIG. 1 is a schematic structural view of a wireless charging system shown in the present disclosure.

FIG. 1 is a schematic structural view of a wireless charging system shown in the present disclosure. Referring to FIG. 1, the system includes a transmitting end 101 for converting an electrical signal into an electromagnetic wave for radiation, and a receiving end 102 for receiving the electromagnetic wave and converting it into electrical signal so as to output to the battery. During charging, a transmitting coil in the transmitting end 101 and a receiving coil in the receiving end 102 are aligned, and an optimal charging efficiency, such as about 84%, can be achieved. However, when the receiving coil and the transmitting coil are misaligned, the charging efficiency drops a lot.

Figure 2:
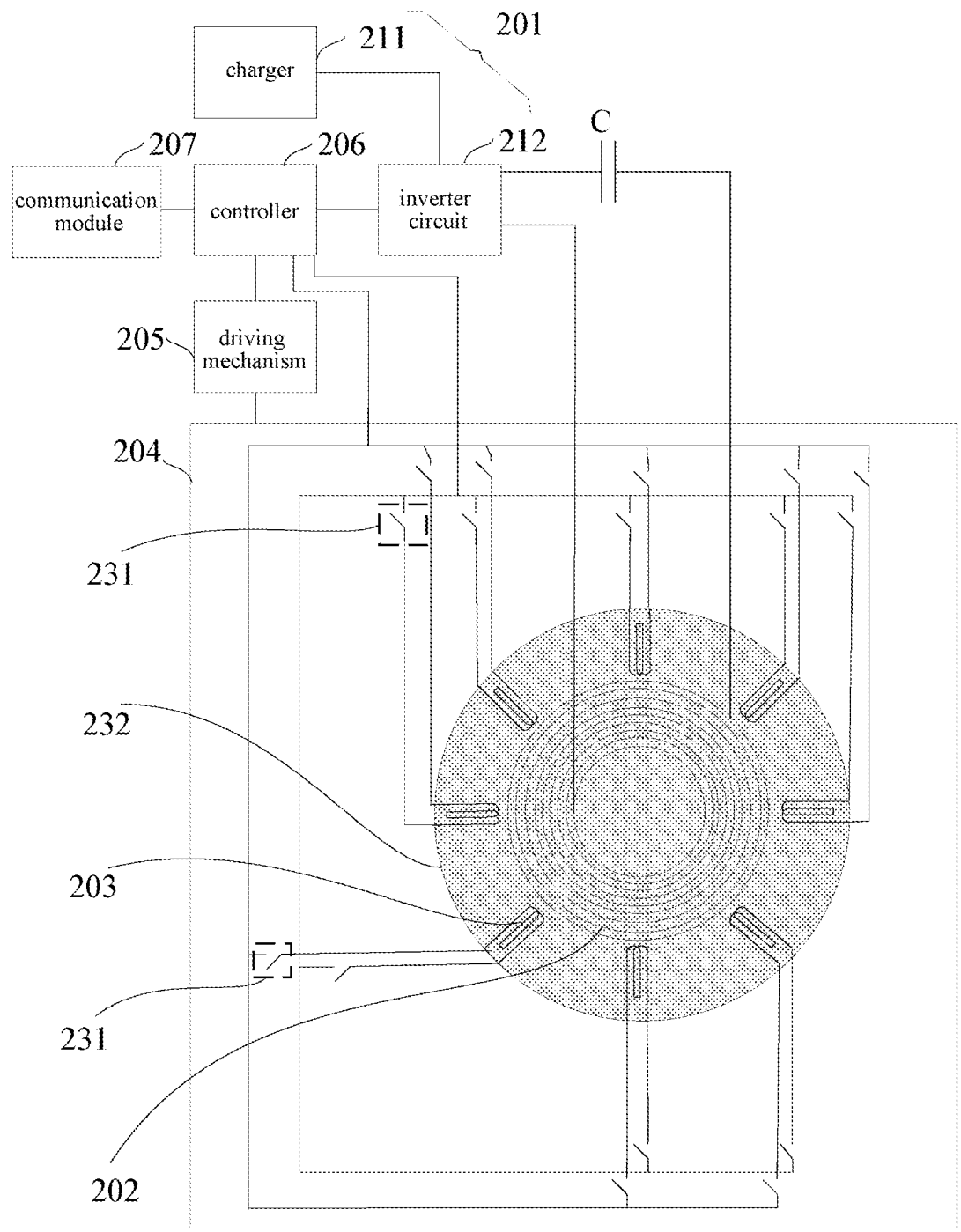
FIG. 2 is a schematic structural view of a wireless charging device according to an embodiment of the present disclosure.

FIG. 2 is a schematic structural view of a wireless charging device according to an embodiment of the present disclosure. The wireless charging device may be the transmitting end 101. Referring to FIG. 2, the wireless charging device includes a power supply circuit 201, a transmitting coil 202, a plurality of detecting coils 203, a movable coil carrier 204, a driving mechanism 205, and a controller 206.

The power supply circuit 201 is configured to provide an alternating current signal.

The transmitting coil 202 is configured to convert the alternating current signal into electromagnetic waves to radiate to the receiving end.

The plurality of detecting coils 203 are arranged to be circumferentially spaced along the transmitting coil 202. A circular track formed by the plurality of detecting coils 203 is concentric with the transmitting coil 202. The detecting coils 203 are configured to radiate energy to the receiving coil of the receiving end and generate an inductive signal.

The transmitting coil 202 and the plurality of detecting coils 203 are both disposed on the movable coil carrier 204.

The drive mechanism 205 is connected to the movable coil carrier 204 and configured to drive the movable coil carrier 204 to move.

The controller 206 is configured to acquire inductive signals of the plurality of detecting coils 203, and control the position of the movable coil carrier 204 by controlling the driving mechanism 205 based on the inductive signals of the plurality of detecting coils 203.

In the embodiment of the present disclosure, the plurality of detecting coils 203 are arranged spaced around the transmitting coil 202. Each of the plurality of detecting coils 203 is used to generate an inductive signal with the receiving coil. Since the magnitude of each of the inductive signals is related to the distance, it is possible to determine whether the receiving coil and the transmitting coil are aligned according to a plurality of the inductive signals. When the receiving coil and the transmitting coil are not aligned, the position of the movable coil carrier 204 can be controlled by the controller 206 to align the receiving coil and the transmitting coil so as to improve the charging efficiency of the wireless charging. Meanwhile, since the detecting coils 203 are arranged around the transmitting coil 202 instead of being arranged between the transmitting coil 202 and the receiving coil, there is no eddy current generated between the transmitting coil 202 and the receiving coil, which eddy current affects the charging efficiency by 5% or more, that is, there is no effect on the energy transfer between the transmitting coil 202 and the receiving coil.

It should be noted that the receiving end can be placed above the transmitting end by a platform or bracket, and the platform or bracket does not move along with the coil carrier 204. The platform or bracket may be part of the wireless charging device.

In the embodiment of the present disclosure, the power supply circuit 201 may include a charger 211 and an inverter circuit 212. The charger 211 is configured to convert an alternating current provided by a power source into a direct current signal, and the inverter circuit 212 is configured to convert the direct current signal into an alternating current signal.

Illustratively, the charger 211 can be a Direct Power Charger (DPC), a Quick Charge 1 (QC1) charger, a QC2 charger, a QC3 charger, a QC4 charger, or a Power Delivery (PD) charger. The inverter circuit 212 can be a full bridge/half bridge inverter circuit. The transmitting coil 202 is typically made of a wire of N strands, wherein N is 8-12, or a Flexible Printed Circuit (FPC) copper wire.

In an embodiment of the present disclosure, the detecting coil 203 is a rounded rectangular coil with 2 to 3 turns, and the length direction of the rounded rectangular coil passes through the center of the transmitting coil 202.

In this implementation, a rounded rectangular coil with 2 to 3 turns is used as the detecting coil. On the one hand, it can be designed to be small enough so that even if a plurality of detecting coils are provided, the entire wireless charging device will not be oversized. On the other hand, this rounded rectangle design enables energy radiation between the detecting coil and the receiving coil to generate an inductive signal.

As shown in FIG. 2, the detecting coil 203 is designed in 2 turns, and the 2 turns of the rounded rectangular coil are staggered to form an m-like shape. In this design, a soft wire may be used as the coil material to avoid short circuit at the intersection. In other implementations, the rounded rectangular coil may also have a paper clip structure, which is not limited in this application.

The size of the detecting coil 203 can be designed to be small, for example, the length of the detecting coil can be ⅓ to ½ of the radius of the transmitting coil 202, and the width of the detecting coil can be ¼ to ⅓ of the length of the detecting coil. The size of the detecting coil 203 can be designed according to actual needs, and the above values are only exemplary.

As shown in FIG. 2, a plurality of detecting coils 203 are arranged in pairs, a plurality of the pairs of detecting coils 203 are evenly spaced, and each pair of the detecting coils 203 is symmetrical with respect to the transmitting coils 202.

In this implementation, a plurality of detecting coils 203 are arranged in pairs, and each pair of the detecting coils 203 are symmetrically arranged with respect to the transmitting coils 202 such that the controller 206 can determine the position of the receiving coil based on the signals of each pair of the detecting coils 203. This is because if the receiving coil is aligned with the center of the transmitting coil, the distance between the pair of the detecting coils 203 and the center of the transmitting coil is equal, at which time the magnitudes of the inductive signals generated by the pair of the detecting coils are equal. Conversely, the controller can determine whether the receiving coil is offset and the amount of offset according to the magnitudes of the inductive signals generated by the pair of the detecting coils.

Illustratively, the number of the detecting coils 203 may be eight as shown in the figure, and the eight detecting coils 203 are divided into four pairs. In other implementations, the number of the detecting coils 203 may also be four, sixteen or the like. The greater the number of detecting coils 203 is, the higher the position detection accuracy is; and the smaller the number of detecting coils is, the simpler the circuit is.

In the embodiment of the present disclosure, both ends of the detecting coil 203 are configured as an excitation signal input end and an inductive signal output end, respectively.

In this implementation, both ends of the detecting coils 203 are used as an excitation signal input end and an inductive signal output end, respectively. An excitation signal is input and generate an inductive signal with the receiving coil, based on which the present disclosure determines whether the transmitting coil and the receiving coil are aligned.

As shown in FIG. 2, each of the detecting coils 203 is arranged along the radial direction of the transmitting coil 202, and the coils of each pair of the detecting coils 203 are arranged oppositely. Illustratively, the minimum distance between a detecting coil 203 and a transmitting coil 202 can be 2 mm.

As shown in FIG. 2, a controllable switch 231 is provided between the controller 206 and each of the excitation signal input end and the inductive signal output end of each of the detecting coils 203.

The controller 206 is configured to cyclically control the controllable switches 231 connected to each of the detecting coils 203 to be turned on and off. At any time, only one of the controllable switches 231 connected to a corresponding one of the detection coils 203 is turned on.

In this implementation, each of the control coils 203 is cyclically controlled by the controllable switches 231 to prevent the each of the coils from working simultaneously and interfering with each other. Meanwhile, since each of the detecting coils is cyclically controlled, the receiving coil and the transmitting coil can be controlled to be aligned not only at the beginning of charging but also during charging.

In the embodiment of the present disclosure, each of the controllable switches 231 can be implemented by using an integrated switch or one or more metal oxide semiconductor (MOS) field effect transistors.

In an implementation of an embodiment of the present disclosure, the movable coil carrier 204 includes:

a circuit board, and a transmitting coil 202 and a plurality of detecting coils 203 are located on the circuit board.

In this implementation, the transmitting coil 202 and the detecting coils 203 are arranged on the circuit board, and then a driving mechanism 205 is used to drive the movement thereof. On the one hand, it facilitates miniaturization by integrating the coils on the circuit board. On the other hand, it is easy to drive the coils to move by designing it on the circuit board.

The plurality of detecting coils 203 and the transmitting coil 202 are in the same plane, so that the detecting coils not only can detect the coils well, but also can maintain efficiency or substantially maintain efficiency during high-power wireless charging, that is, the effect of high-power wireless charging on efficiency is very small and can be ignored.

Illustratively, the circuit board can be a printed circuit board, and the aforementioned transmitting coil 202, the plurality of detecting coils 203, the controllable switches 231, and routes therebetween can be arranged on the circuit board.

As shown in FIG. 2, since a controllable switch is disposed between each of the detecting coils 203 and the controller, the controller can connect all the detecting coils through two routes, thereby reducing the circuit design complexity.

As shown in FIG. 2, the circuit board is further provided with a round of magnetic shielding material 232. The magnetic shielding material 232 is a material having a high magnetic permeability, and may be, for example, a ferrite material. The magnetic shielding material 232 may be circular in shape, and the transmitting and detecting coils are disposed on the magnetic shielding material 232 to provide a high magnetic permeability path for wireless charging, which significantly improves efficiency and reduces heat generation.

Illustratively, the driving mechanism 205 may include a motor, a motor driving circuit, and a linear motion component. The controller sends a signal to the motor driving circuit, so that the motor driving circuit can control the motor to rotate forward or reverse and the number of the movement according to the signal of the controller. The linear motion component can be driven to move linearly by the rotation of the motor, and the linear motion component drives the circuit board to move. In order to ensure that the circuit board can be moved in any direction, the above driving mechanisms 205 are arranged in two groups. The directions of movement of the circuit board driven by the two groups of driving mechanisms 205 are perpendicular to each other, and any one of the two groups of driving mechanisms 205 can slide in the driving direction of the another group (for example, on the slide rails), so that the circuit board can slide in any direction and at any distance. When controlling, the controller only needs to be decomposed into two vertical directions based on the determined moving direction and distance, and then control the rotation direction and the number of revolutions of the two motors, respectively.

For example, the motor may be a stepping motor to facilitate driving control. The linear motion component may be a crank slider, etc. The crank slider converts the rotation of the motor output shaft into a linear motion of the slider, and the circuit board is disposed on the slider.

In an embodiment of the present disclosure, the controller 206 inputs an excitation signal to the detecting coil through the excitation signal input end of a detecting coil. The detecting coil generates energy radiation, and generates an induction signal after a period of time. The induction signal is output to the controller through the inductive signal output end. The controller can be implemented using a processor or other chip with control functions.

The controller 206 is configured to compare the (voltage) amplitude difference of the inductive signals detected by each pair of the detecting coils 203. When the amplitude difference between the two inductive signals detected by at least one pair of the detecting coils 203 is greater than a threshold, moving the position of the movable coil carrier 204 based on the amplitude difference between the two sensing signals detected by each pair of the detecting coils 203

In this implementation, the amplitude of the inductive signal of each pair of the detecting coils 203 represents the distance between the receiving coil and the two detecting coils 203. If the difference between the two amplitudes of the inductive signals of each pair of the detecting coils 203 is greater than a threshold, it is then indicated that the receiving coil and the transmitting coil 202 are not aligned in the direction of the pair of the detecting coils 203, so that the position of the movable coil carrier 204 needs to be moved to align the receiving coil and the transmitting coil.

Here, the amplitude difference may be determined based on the distance. For example, the receiving coil and the transmitting coil are offset in a certain direction within a range of 2 mm, and the fast charging can be achieved. In this case, the amplitude difference corresponding to the 2 mm offset can be used as the threshold. Of course, the threshold here can also be designed to be larger or smaller, and the application does not limit this.

In an implementation of the embodiment of the present disclosure, the controller 206 is configured to determine, based on the amplitude difference of the inductive signals of one pair of the detecting coils 203, the direction and distance of the movable coil carrier 204 moving in a direction where the one pair of the detecting coils 203 are arranged; and configured to determine, based on the direction and distance of the movable coil carrier 204 moving in the directions where all pairs of the detecting coils 203 are arranged, the moving direction and distance of the movable coil carrier 204.

In this implementation, the offset in the direction of the pair of the detecting coils 203 is determined according to the amplitude difference of the inductive signals of each pair of the detecting coils 203, thereby the distance needed to be moved is determined. Then the distances that need to be moved in each direction are integrated to obtain the direction i and distance of the movable coil carrier 204 that ultimately needs to be moved. Moving in this direction and at this distance may eliminate the offset in each direction and maximize the charging efficiency.

In the embodiment of the present disclosure, the correspondence between the amplitude difference and the distance to be moved may be determined experimentally in advance, and in the application, the correspondence may be used to determine the distance to be moved. For example, the amplitude difference range of each step corresponds to a moving distance. Thus, when the amplitude difference is obtained, the corresponding distance to be moved can be obtained by checking the comparison table between the amplitude difference and the distance to be moved.

Illustratively, when determining the direction and distance of movement of each pair of the detecting coils 203 in the arrangement direction, the moving distance in each direction can be used as a vector, and the sum of the vectors can be calculated to obtain the final direction and distance of movement of the movable coil carrier 204.

In an implementation of the embodiment of the present disclosure, the controller 206 is further configured to compare the difference between the amplitude of the inductive signal of each detecting coil 203 and the reference value. If any difference between the amplitude and the reference value exceeds the threshold, it is determined that there is a receiving coil. If every difference between the amplitude and the reference value exceeds the threshold, it is determined that there is no receiving coil.

In this implementation, by the amplitude of the inductive signal of each detecting coil 203, it can be determined whether the current transmitting coil is correspondingly provided with a receiving coil. Only when it has determined that there is a receiving coil, it is determined whether the transmitting coil needs to be moved, in order to avoid moving without a receiving coil which may cause energy waste.

In the embodiment of the present application, the reference value refers to the amplitude of the inductive signal of the detecting coil 203 when there is no receiving coil.

In an implementation of the embodiment of the present disclosure, the device may further include:

a communication module 207 configured to perform wireless communication with the receiving end to authenticate the receiving end, and a controller 206 configured to control the position of the movable coil carrier 204 based on the inductive signals of a plurality of detecting coils 203 when the receiving end is authenticated.

In this implementation, the receiving end is authenticated by a communication module 207, and after the authentication is passed, the position of the movable coil carrier 204 is controlled, in order to prevent the movable coil carrier 204 from moving when the receiving end is an illegal receiving end which is not charged subsequently and avoid the energy waste that comes with it.

Illustratively, communication module 207 can include a modulation and demodulation circuit and a protocol communication unit.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

The aforementioned authentication process can be performed by the protocol communication unit. The authentication work can be completed by the protocol communication unit, and the verification method can be implemented by using a common authentication algorithm. The protocol communication unit may be a Bluetooth unit or a Near Field Communication (NFC) unit, and the protocol communication unit uses a Bluetooth or NFC protocol as a carrier to transmit information of the proprietary protocol thereon. The private protocol is pre-arranged by the receiving end and the transmitting end, and the transmitted information may further include the power lifting instruction, the current power indication information, the foregoing charger information and the like in the wireless charging standard (Qi specification).

In other implementations, the protocol communication unit may also employ other protocol communication units, such as a wireless high fidelity (WI-FI) unit. Alternatively, the wireless charging device may only be provided with a modulation and demodulation circuit and without a protocol communication unit.

The modulation and demodulation circuit belongs to in-band communication, and is responsible for performing standard protocol-based interaction with the transmitting end, and determines whether a protocol communication unit exists at the opposite end in the process; if exists, the subsequent communication process may be completed by using a protocol communication unit, that is, out-of-band communication. The quality of the in-band communication signal is affected by load fluctuation and coil coupling, so that it will lead to signal demodulation failure, resulting in charging interruption. The signal quality is not affected by load and coil coupling by using out-of-band communication, and communication quality is greatly improved.

Illustratively, a modulation and demodulation circuit can be connected between the charger 211 and the inverter module 201. The modulation and demodulation circuit is used for demodulating an amplitude shift keying (ASK) signal, and for generating a frequency shift keying (FSK) signal by controlling the current and voltage of a coil, thereby performing information interaction with the receiving end. Here, the content of the information interaction is implemented based on the Qi specification, and the modulation and demodulation circuit communicates with the receiving end to determine that it is based on a standard power profile (BPP) charging or an extensible power profile (EPP) charging. Illustratively, if BPP charging is used, the voltage of the output Vout of the transmitting coil is 5V, and if EPP charging is used, the voltage of the output Vout of the transmitting coil is 12V.

The following is an example of a wireless charging device with eight detecting coils, each of which is N1, N2 . . . , N8, respectively, and which are divided into four sets of diagonal coils. If the amplitudes of the inductive signals obtained by the four sets of diagonal coils are equal, they are aligned.

1) When the wireless charging device starts to work, the wireless charging device starts detecting whether there is a receiving end. The controller sends an excitation signal pulse to a detecting coil through the excitation signal input end every time T, such as 250 ms. The excitation signal has a frequency of 1 Mhz and a duration of t, t<T, and the amplitude of the excitation signal may be related to the magnitudes of the coil inductance of the coils N1 . . . N8. It controls the N1 coil to turn on and sends the first pulse, and then tests the amplitude V1 of the inductive signal in time t. It controls the N2 coil to turn on and sends the second pulse, and then tests the amplitude V2 of the inductive signal in time t. The amplitudes of the inductive signals of the 8 coils are tested in total.

If all the differences between the amplitudes of V1, V2 . . . V8 and the reference value are within the threshold range, It is considered that no receiving end to be placed on the transmitting end. If one or more of the differences between the amplitude(s) of one or several of V1, V2 . . . V8 and the reference value is/are greater than the threshold, it is considered that there exists a receiving end.

2) When there exists a receiving end, the controller sends a digital ping through the communication module to authenticate the receiving end. According to the QI specification, if the receiving end replies with the 0x01 ASK signal within the corresponding time, it is a legal device, and if not, it is an illegal device.

3) If it is a legal device, the controller determines whether it is necessary to move the transmitting coil according to the magnitude of V1, V2 . . . V8, and calculates the moving direction and distance when it needs to move.

4) Converting the direction and distance of movement into control signal for feedback to the motor control circuit to control the movement of the stepper motor.

During the charging process, the detecting coil is always working, and the entire transmitting coil and the receiving coil are aligned by multiple position detections. Therefore, in this solution, the transmitting coil and the receiving coil can be aligned not only in stage that the receiving end is just placed. The method can also detect and move the coil in real time to achieve alignment in the process of high-power wireless charging, even if the receiving end accidentally slides or moves.

Figure 3:
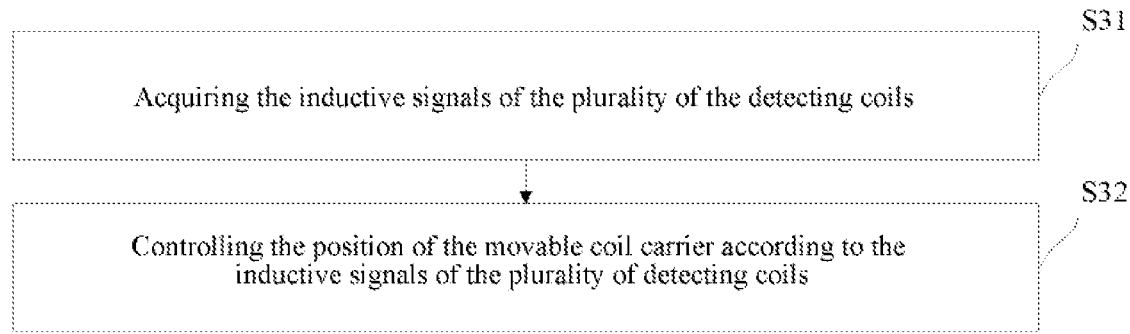
FIG. 3 is a flowchart of a wireless charging control method according to an embodiment of the present disclosure.

FIG. 3 is a flowchart of a wireless charging control method according to an embodiment of the present disclosure. The method is applicable to the wireless charging device shown in FIG. 2. As shown in FIG. 3, the method includes the following steps.

In step S31, the inductive signals of the plurality of the detecting coils are acquired.

In step S32, the position of the movable coil carrier is controlled based on the inductive signals of the plurality of detecting coils.

In an implementation of an embodiment of the present disclosure, the plurality of detecting coils are arranged in pairs, multiple pairs of the detecting coils are arranged to be evenly spaced, and each pair of the detecting coils is symmetrical about the transmitting coil; and controlling the position of the movable coil carrier based on the inductive signals of the plurality of detecting coils including:

comparing the amplitude difference between the two inductive signals detected by each pair of the detecting coils; when the amplitude difference between the two inductive signals detected by the at least one pair of the detecting coils is greater than a threshold, moving the position of the movable coil carrier based on the amplitude difference between the two inductive signals detected by each pair of the detecting coils.

In an implementation of an embodiment of the present disclosure, moving the position of the movable coil carrier based on the amplitude difference between the two inductive signals detected by each pair of the detecting coils includes:

determining the direction and distance of the movable coil carrier moving in a direction in which the one pair of the detecting coils are arranged, based on the amplitude difference between the inductive signals of the one pair of the detecting coils; and determining the moving direction and distance of the movable coil carrier, based on the direction and distance of the movable coil carrier moving in a direction in which all pairs of the detecting coils are arranged.

In the embodiment of the present disclosure, the correspondence between the amplitude difference and the distance to be moved may be determined experimentally in advance, and in the application, the correspondence may be used to determine the distance to be moved. For example, the amplitude difference range of each step corresponds to a moving distance. Thus, when the amplitude difference is obtained, the corresponding distance to be moved can be obtained by checking the comparison table between the amplitude difference and the distance to be moved.

Illustratively, when determining the direction and distance of movement of each pair of the detecting coils in the arrangement direction, the moving distance in each direction can be used as a vector, and the sum of the vectors can be calculated to obtain the final direction and distance of movement of the movable coil carrier.

In an implementation of an embodiment of the present disclosure, the method may further include:

comparing the difference between the amplitude of the inductive signal of each detecting coil and the reference value, and if any difference between the amplitude and the reference value exceeds the threshold, it is determined that there is a receiving coil.

In an implementation of an embodiment of the present disclosure, the method may further include:

performing wireless communication with the receiving end to authenticate the receiving end;

controlling a position of the movable coil carrier based on the inductive signals of the plurality of detecting coils when the receiving end is authenticated.

Figure 4:
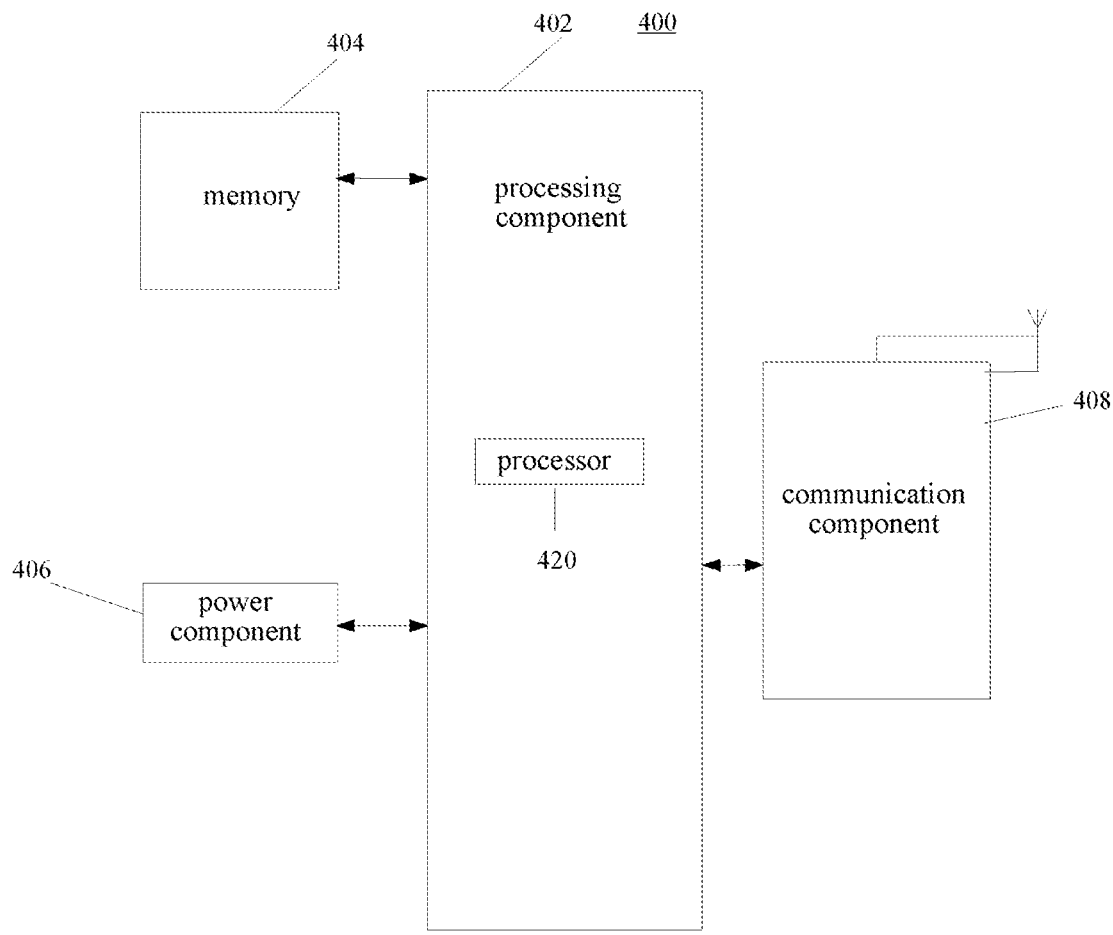
FIG. 4 is a block diagram of a charging equipment according to an exemplary embodiment.

FIG. 4 is a block diagram of a charging equipment 400 according to an exemplary embodiment. Referring to FIG. 4, charging equipment 400 can include one or more of the following components: processing component 402, memory 404, power component 406, and communication component 408.

Processing component 402 typically controls the overall operation of charging equipment 400, such as operations associated with display, telephone calls, data communications, camera operations, and recording operations. Processing component 402 can include one or more processors 420 to execute instructions to perform all or part of the steps of the methods described above. Moreover, processing component 402 can include one or more modules to facilitate interaction between component 402 and other components. For example, processing component 402 can include a multimedia module to facilitate interaction between multimedia component 408 and processing component 402.

Memory 404 is configured to store various types of data to support operation at charging equipment 400. Examples of such data include instructions for any software program or method operating on charging equipment 400, contact data, phone book data, messages, pictures, videos, and the like. Memory 404 can be implemented by any type of volatile or non-volatile storage device, or a combination thereof, such as static random access memory (SRAM), electrically erasable programmable read only memory (EEPROM), electrically programmable read only memory (EPROM), programmable read only memory (PROM), read only memory (ROM), magnetic memory, flash memory, disk or optical disk.

Power component 406 provides power to various components of charging equipment 400. Power component 406 can include a power management system, one or more power sources, and other components associated with generating, managing, and distributing power for the charging equipment 400.

Communication component 408 is configured to facilitate wireless communication between charging equipment 400 and other equipment. In an embodiment of the present disclosure, the communication component 408 can access a wireless network based on a communication standard, such as 2G, 3G, 4G, or 5G, or a combination thereof, in order to implement physical downlink control signaling detection. In an exemplary embodiment, a communication component 408 receives broadcast signals or broadcast associated information from an external broadcast management system via a broadcast channel. Optionally, the communication component 408 also includes an NFC module.

In an exemplary embodiment, charging equipment 400 may be implemented by one or more software application specific integrated circuits (ASIC), digital signal processors (DSP), digital signal processing devices (DSPD), programmable logic devices (PLD), programmed gate arrays (FPGA), controller, microcontroller, microprocessor or other electronic component implementation for performing the wireless charging control method described above.

In an exemplary embodiment, there is also provided a non-transitory computer readable storage medium containing an instruction, such as a memory 404 containing an instruction. The instruction is executable by the processor 420 of the charging equipment 400 to perform the wireless charging control method described above. For example, the non-transitory computer readable storage medium can be a ROM, a random-access memory (RAM), a CD-ROM, a magnetic tape, a floppy disk, and an optical data storage device.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A wireless charging device comprising:
   a power supply circuit configured to provide an alternating current signal;
   a transmitting coil configured to convert the alternating current signal into electromagnetic waves to radiate to a receiving end;
   a plurality of detecting coils arranged to be circumferentially spaced along the transmitting coil, wherein the plurality of the detecting coils forms a circular track which is concentric with the transmitting coil, and the detecting coils each is configured to radiate energy to a receiving coil of the receiving end and generate an inductive signal;
   a movable coil carrier, on which both the transmitting coil and the plurality of the detecting coils are disposed;
   a driving mechanism connected to the movable coil carrier and configured to drive the movable coil carrier to move; and
   a controller configured to acquire the inductive signals of the plurality of detecting coils, and control the position of the movable coil carrier by controlling the driving mechanism based on the inductive signals of the plurality of the detecting coils, wherein the controller is further configured:
   to compare a difference between an amplitude of the inductive signal of each detecting coil and a reference value, the reference value referring to an amplitude of the inductive signal of the detecting coil when there is no receiving coil, and to determine that:
   there is a receiving coil if one of the differences between the amplitudes of the plurality of detecting coils and the reference value exceeds a threshold;
   there is no receiving coil if all of the differences between the amplitudes of the plurality of detecting coils and the reference value are within the threshold, wherein the controller is further configured to control the movable coil carrier not to move.

2. The wireless charging device according to claim 1, wherein the detecting coils each is a rounded rectangular coil with two to three turns, and the rounded rectangular coil having a length direction which passes through the center of the transmitting coil.

3. The wireless charging device according to claim 2, wherein the movable coil carrier comprises:

a circuit board, on which the transmitting coil and the plurality of detecting coils are located.

4. The wireless charging device according to claim 2, wherein the device further comprises:
a communication module configured to perform wireless communication with the receiving end to authenticate the receiving end; and
the controller is configured to, when the receiving end is authenticated, control the position of the movable coil carrier based on the inductive signals of the plurality of detecting coils.

5. The wireless charging device according to claim 1, wherein the plurality of detecting coils are arranged in pairs, multiple pairs of the detecting coils are arranged to be evenly spaced, and each pair of the detecting coils is symmetric about the transmitting coil.

6. The wireless charging device according to claim 5, wherein the controller is configured to compare an amplitude difference between two inductive signals detected by each pair of the detecting coils; when the amplitude difference between the two inductive signals detected by at least one pair of the detecting coils is greater than a threshold, the position of the movable coil carrier is moved based on the amplitude difference between the two inductive signals detected by each pair of the detecting coils.

7. The wireless charging device according to claim 6, wherein the controller is configured to determine, based on the amplitude difference between the inductive signals of one pair of the detecting coils, the direction and distance of the movable coil carrier moves in the direction where the one pair of the detecting coils are arranged; and configured to determine, based on the direction and distance of the movable coil carrier moving in the directions where all pairs of the detecting coils are arranged, the moving direction and distance of the movable coil carrier.

8. The wireless charging device according to claim 7, wherein both ends of each of the detecting coils are respectively configured as an excitation signal input end and an inductive signal output end.

9. The wireless charging device according to claim 8, further comprises a plurality of controllable switches, each of the controllable switches is provided between the controller and each of the excitation signal input end and the inductive signal output end of each of the detecting coils, and
the controller is configured to cyclically control the turn on and off of the controllable switches which are connected to each of the detecting coils, and only one controllable switch connected to one of the detection coils is turned on at any time.

10. The wireless charging device according to claim 1, wherein the movable coil carrier comprises:
a circuit board, on which the transmitting coil and the plurality of detecting coils are located.

11. The wireless charging device according to claim 1, wherein the device further comprises:
a communication module configured to perform wireless communication with the receiving end to authenticate the receiving end; and
the controller is configured to, when the receiving end is authenticated, control the position of the movable coil carrier based on the inductive signals of the plurality of detecting coils.

12. A wireless charging system, wherein the wireless charging system comprises a transmitting end and a receiving end; and the transmitting end is a wireless charging device comprising:

a power supply circuit configured to provide an alternating current signal;
a transmitting coil configured to convert the alternating current signal into electromagnetic waves to radiate to a receiving end;
a plurality of detecting coils arranged to be circumferentially spaced along the transmitting coil, wherein the plurality of the detecting coils forms a circular track which is concentric with the transmitting coil, and the detecting coils each is configured to radiate energy to a receiving coil of the receiving end and generate an inductive signal;
a movable coil carrier, on which both the transmitting coil and the plurality of the detecting coils are disposed;
a driving mechanism connected to the movable coil carrier and configured to drive the movable coil carrier to move; and
a controller configured to acquire the inductive signals of the plurality of detecting coils, and control the position of the movable coil carrier by controlling the driving mechanism based on the inductive signals of the plurality of the detecting coils, wherein the controller is further configured:
to compare a difference between an amplitude of the inductive signal of each detecting coil and a reference value, the reference value referring to an amplitude of the inductive signal of the detecting coil when there is no receiving coil, and to determine that:
there is a receiving coil if one of the differences between the amplitudes of the plurality of detecting coils and the reference value exceeds a threshold;
there is no receiving coil if all of the differences between the amplitudes of the plurality of detecting coils and the reference value are within the threshold, wherein the controller is further configured to control the movable coil carrier not to move.

13. A wireless charging control method, wherein the method is applied to a wireless charging device comprising:
a power supply circuit configured to provide an alternating current signal;
a transmitting coil configured to convert the alternating current signal into electromagnetic waves to radiate to a receiving end;
a plurality of detecting coils arranged to be circumferentially spaced along the transmitting coil, wherein the plurality of the detecting coils forms a circular track which is concentric with the transmitting coil, and the detecting coils each is configured to radiate energy to a receiving coil of the receiving end and generate an inductive signal;
a movable coil carrier, on which both the transmitting coil and the plurality of the detecting coils are disposed;
a driving mechanism connected to the movable coil carrier and configured to drive the movable coil carrier to move;
a controller configured to acquire the inductive signals of the plurality of detecting coils, and control the position of the movable coil carrier by controlling the driving mechanism based on the inductive signals of the plurality of the detecting coils, wherein the controller is further configured: to compare a difference between an amplitude of the inductive signal of each detecting coil and a reference value, the reference value referring to an amplitude of the inductive signal of the detecting coil when there is no receiving coil, and to determine that: there is a receiving coil if one of the differences between the amplitudes of the plurality of detecting coils and the reference value exceeds a threshold; there is no receiving coil if all of the differences between the amplitudes of the plurality of detecting coils and the reference value are within the threshold;

and the wireless charging control method comprises:

acquiring the inductive signals of the plurality of detecting coils;

controlling the position of the movable coil carrier based on the inductive signals of the plurality of detecting coils;

comparing a difference between an amplitude of the inductive signal of each detecting coil and a reference value, the reference value referring to an amplitude of the inductive signal of the detecting coil when there is no receiving coil; and determining that:

there is a receiving coil if one of the differences between the amplitudes of the plurality of detecting coils and the reference value exceeds a threshold;

there is no receiving coil if all of the differences between the amplitudes of the plurality of detecting coils and the reference value are within the threshold, wherein the wireless charging control method further comprises controlling the movable coil carrier not to move.

14. The wireless charging control method according to claim 13, wherein the plurality of detecting coils are arranged in pairs, multiple pairs of the detecting coils are arranged to be evenly spaced, and each pair of the detecting coils is symmetrical about the transmitting coil; the step of controlling the position of the movable coil carrier based on the inductive signals of the plurality of detecting coils comprises:

comparing a amplitude difference between two inductive signals detected by each pair of the detecting coils; when the amplitude difference between the two inductive signals detected by the at least one pair of the detecting coils is greater than a threshold, moving the position of the movable coil carrier based on the amplitude difference between the two inductive signals detected by each pair of the detecting coils.

15. The wireless charging control method according to claim 14, wherein the step of moving the position of the movable coil carrier based on the amplitude difference between the two inductive signals detected by each pair of the detecting coils comprises:

determining, based on the amplitude difference between the inductive signals of one pair of the detecting coils, the direction and distance of the movable coil carrier moving in the direction in which the one pair of the detecting coils are arranged; and determining, based on the direction and distance of the movable coil carrier moving in the direction in which all pairs of the detecting coils are arranged, the moving direction and distance of the movable coil carrier.

16. The wireless charging control method according to claim 15, wherein the method further comprises:

performing wireless communication with the receiving end to authenticate the receiving end;

controlling a position of the movable coil carrier based on the inductive signals of the plurality of detecting coils when the receiving end is authenticated.

17. The wireless charging control method according to claim 14, wherein the method further comprises:

performing wireless communication with the receiving end to authenticate the receiving end;

controlling a position of the movable coil carrier based on the inductive signals of the plurality of detecting coils when the receiving end is authenticated.

18. The wireless charging control method according to claim 13, wherein the method further comprises:

performing wireless communication with the receiving end to authenticate the receiving end;

controlling a position of the movable coil carrier based on the inductive signals of the plurality of detecting coils when the receiving end is authenticated.

\* \* \* \* \*